United States Patent [19]

Stieff et al.

[11] 4,095,872
[45] Jun. 20, 1978

[54] SECURITY SEALING SYSTEM USING FIBER OPTICS

[75] Inventors: Lorin R. Stieff, Kensington; Charles L. Pruitt, Hyattsville; Reinhard R. Ulrich, Rockville, all of Md.; Frank S. Houck, Falls Church, Va.

[73] Assignee: The United States of America as represented by the Secretary of the Army, Washington, D.C.

[21] Appl. No.: 759,161

[22] Filed: Jan. 13, 1977

[51] Int. Cl.² .............................................. G02B 5/16
[52] U.S. Cl. .................................. 350/96.24; 70/440; 350/96.20
[58] Field of Search ................ 350/96 B, 96 R, 96 C; 70/440

[56] References Cited

U.S. PATENT DOCUMENTS

| | | | |
|---|---|---|---|
| 3,854,792 | 12/1974 | Koelle | 350/96 B |
| 3,999,837 | 12/1976 | Bowen et al. | 350/96 C |

OTHER PUBLICATIONS

Electronic Components, Jan. 1972, by Parfitt et al., pp. 69 & 73–75.

*Primary Examiner*—John K. Corbin
*Assistant Examiner*—Stewart Levy
*Attorney, Agent, or Firm*—Nathan Edelberg; Robert P. Gibson; Saul Elbaum

[57] ABSTRACT

The invention is directed to a security device which detects tampering with a secured closure. A fiber optic bundle is looped through a closure and secured at opposite ends of the bundle to a collar. After installation, light is passed through the fiber optics and they generate a particular pattern at a viewing end of the collar. If there is any tampering with the enclosure, the individual fiber optics will be disturbed or cut. Subsequent viewing of the fiber optics will generate a different viewing pattern indicating that tampering has occurred.

10 Claims, 4 Drawing Figures

FIBER OPTIC ENDS

SECURITY SEALING SYSTEM USING FIBER OPTICS

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to security devices and more particularly to a security device for detecting tampering of a closed object or movement of a secured object. Disturbance of individual fibers in a fiber optic bundle is utilized to detect tampering.

BRIEF DESCRIPTION OF THE PRIOR ART

Many different types of ties have been long used for sealing enclosures and locked objects. Often a wire loop and metal seal are employed. If the enclosure is tampered with, the seal is torn or otherwise defaced to indicate tampering. Although such mechanical means are often satisfactory, it is a relatively simple matter to replace the seal with an identical seal so that tampering may go undetected.

The prior art has recognized that fiber optics may be employed as a seal which inherently detects tampering. U.S. Pat. No. 3,854,792 is directed to a fiber optic bundle which is passed through clamps on an object to be secured. One end of the fiber optic bundle is masked and illuminated so as to produce a particular output light pattern at the other end of the bundle. This output light pattern is recorded and the seal may be checked again and again by illuminating the masked end, and checking the light pattern at the other end for similarity with the initial recorded pattern. In addition to the disadvantage of having to install a mask, this patent requires the separated bundle ends to be epoxied in fiber securing or fixing anchors, at each end of the bundle. As a result, it will be appreciated that the prior patented security seal is inconvenient and time consuming to use.

BRIEF DESCRIPTION OF THE PRESENT INVENTION

The present invention utilizes a collar for collecting the outward ends of a fiber optic bundle loop. The collar employs a flexible ferrule for compressing the outward ends of the loop together to form an arbitrary pattern of intermingled fibers. When light is passed through the fiber optics, the individual intermixed fibers generate a unique "fingerprint" or pattern which may be viewed at the collar. The present invention utilizes an appropriate compressible ferrule which retains the individual fibers together yet does not exert sufficient shearing force to destroy individual fibers. The use of such a resilient ferrule is disclosed in the May 24, 1976, issue of Design News, pages 44 and 45. However, the particular article is more appropriately directed to a fiber optic connector which may be installed at opposite ends of a fiber optic bundle to enable the connection of a fiber optic bundle length between two instruments. Therefore, the publication in no way recognizes the substance of the present invention.

The particular structure of the present invention as well as the various methods for viewing the fiber optic "fingerprints" makes the invention extremely easy and rapid to use thereby facilitating field use of the device and detection methods.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
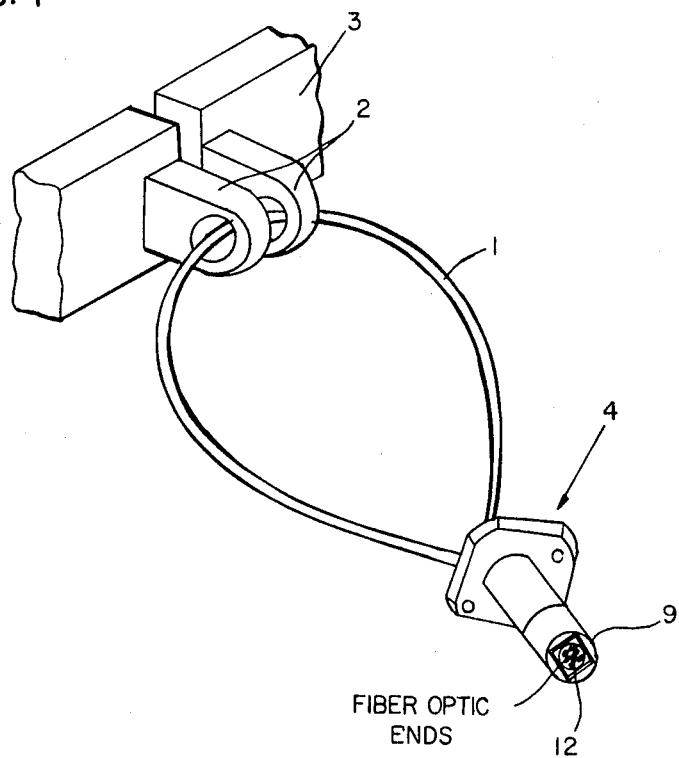
FIG. 1 is a view of the present invention as used in conjunction with a closure.
Figure 2:
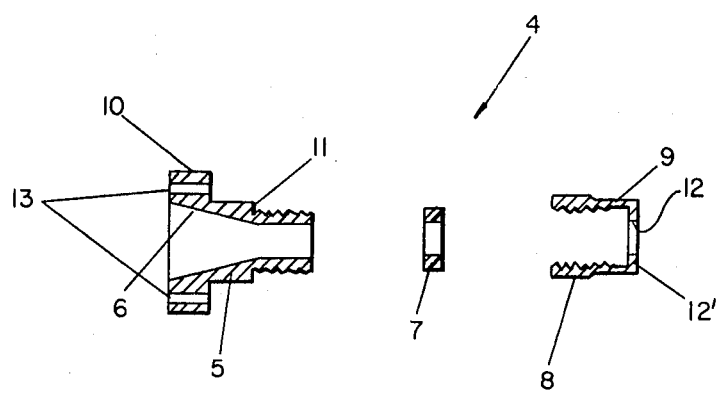
FIG. 2 is a disassembled sectional view of the collar employed in the present invention.
Figure 3:
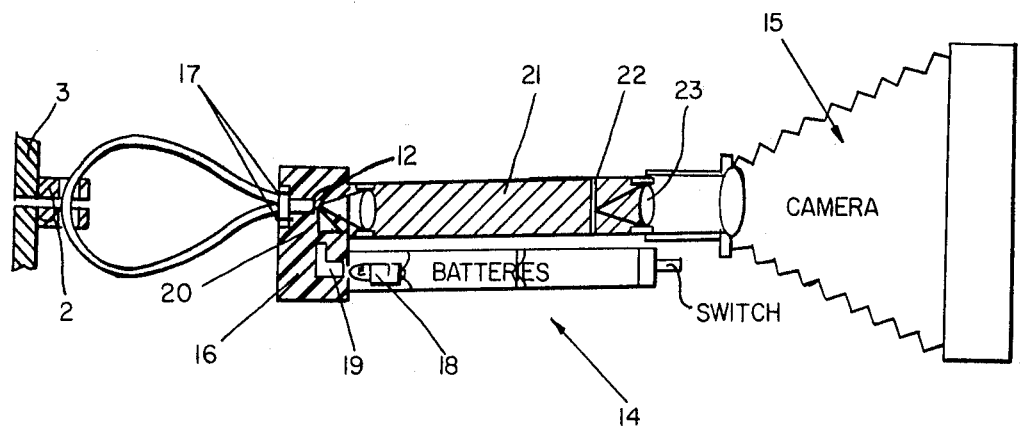
FIG. 3 is a sectional view of a hand-held viewer for viewing the light pattern at the end of the collar.

The invention consists of a fiber optic seal depicted in FIGS. 1 and 2, and inspection equipment depicted in FIG. 3 for identifying the seal and checking its integrity. The embodiment of the fiber optic seal shown in FIG. 1 consists of a fiber optic bundle 1 of many small randomly oriented fibers. The fiber optic bundle is passed through the apertured flanges 2 provided for sealing the container or item 3 to be secured. The two ends of the bundle are looped together with the fibers intermixed and fed into a common collar 4. When light is directed on a portion of the randomly distributed intermixed fibers that pass through the collar, a unique pattern or "fingerprint" is formed at the collar end. This unique fingerprint is utilized to ensure that the seal is tamper-resistant/tamper-indicating. Since the seal is looped upon itself with the fibers intermixed, opening the seal requires either cutting the fiber bundle 1 or removing the fibers from the collar 4. In either case the seal's unique fingerprint is destroyed. Since the seal is often assembled in its field location, the fiber distribution and the resulting fingerprint is unknown until after the seal is installed. The random orientation, striation marks and complexity of the lit fiber ends insures the uniqueness of the seal fingerprints, and makes it highly improbable that the seal can be replaced in the field without indications of tampering.

The collar configuration shown in FIG. 2 is an essential element to the invention in that it creates a seal that can be simply and rapidly assembled in the field. The components of the seal collar are the collar body 5 with a conical opening 6 that accepts the fibers, a flexible ferrule 7 typically made from rubber, and a front end cap 8. As the front end cap 8 is screwed against the collar body 5, the flexible ferrule 7 is compressed against the fibers holding them securely in place. Flat surfaces 9 and 10 provide a means for using wrenches to tighten the end cap 8 against the collar shoulder 11. The seal assembly is completed by cutting the fibers protruding through the collar opening 12 flush with the end cap front surface 12'. Either glass or plastic fiber optics can be used to form seals. However, in the particular embodiment described herein, plastic fibers are preferable in that they further simplify the installation of the seal, and are less fragile than the glass fibers. The plastic fibers are easily cut in one plane with a sharp knife and no further end polishing is required.

The fiber optic seal is identified and its integrity checked with the inspection equipment shown in FIG. 3, having major elements including a hand-held viewer 14, and a camera 15 with Polaroid back. The hand-held viewer has a mounting block 16 for holding the fiber optic seal. In the embodiment shown, two locator pins 17 in the mounting block pass through two holes 13 in the seal collar. These holes are 180° about the collar axis allowing two precise positions of the seal in the mounting block. The hand-held viewer has a battery powered light source 18 that is directed by a light guide 19 and prism 20 onto the fiber ends in one-half of the collar opening 12. The fiber ends in the other half of the collar opening 12 form a unique fingerprint that can be viewed through the microscope 21 and photographed with the camera 15 as the indicated switch is actuated.

One means of identifying the fiber optic seals and checking their integrity requires taking a positive and negative print of the seal's fingerprints upon installation. The seal can be inspected at any subsequent time by taking another positive print and overlaying it with the original negative, and/or taking another negative print and overlaying it on the original positive print. If the negative overlays match the positive prints exactly then the seal has not been tampered with.

Another means of identifying the seal and verifying its integrity is to look at the seal through the hand-held viewer 14 and compare that view with the positive print taken upon installation of the seal. This method requires photographing of the seal only upon installation and not during subsequent inspections, provided a copy of the initial photograph is available at the time of the inspection.

The invention disclosed herein also provides a third means of identifying the seal and verifying its integrity that requires no photographs whatsoever. In this seal identification scheme a reticle 22 is placed in the focal plane of the eyepiece lens 23 of the hand-held viewer 14.

Figure 4:
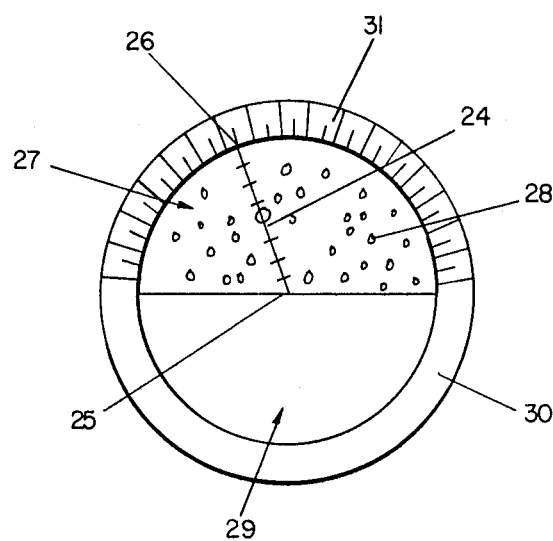
FIG. 4 is an end view of a second type of viewer as employed in the present invention.

FIG. 4 shows one possible reticle pattern configuration suitable for carrying out the identification scheme of this invention. Shown is a reticle pattern consisting of one radial line 24 from the center 25 of the reticle disk to one edge 26. The radial line has markings spaced at radial intervals suitable for locating fiber ends having certain specified diameters. The reticle pattern is projected in sharp focus by the eyepiece lens 23 into the field of view of the hand-held viewer. FIG. 4 shows this field of view as a hemisphere 27 containing light centers 28. Region 29 is obscured by the light directing prism 20 in the hand-held viewer. In the embodiment shown, the reticle disk is free to rotate about its center 25. The reticle is rigidly attached to the eyepiece lens mount 30 that also is free to rotate. Markings 31 on the external part of the eyepiece lens mount 30, and on the outside surface of the hand-held viewer indicate the angular position of the reticle.

The position of a lit fiber end (a light center) can be located and defined by rotating the reticle radial line 24 over the light center and recording its radial position on the line and noting the polar angle of the radial line. Locating a number of light centers in this polar coordinate system can be used to identify the seal and check its integrity. Some fiber ends have striation marks that help identify the seal "fingerprint". The location of these striations in polar coordinates should be noted along with the striation marks to simplify seal identification. Alternatively, the seal can be identified by rotating the reticle to a number of specified polar angles and recording the radial position of all lit fiber ends that fall on the radial line.

In summary, we have invented a fiber optic sealing system that is considerably simpler to install and inspect than previous systems. The simplicity of installation and inspection is accomplished by (1) the assembly using a collar that holds the fibers by a compressed flexible ferrule, and (2) the inspection equipment that allows a compact arrangement for viewing and photographing the seals. Seal identification may be done by rotating the reticle and that requires no photographing of the seal's "fingerprints." The seal disclosed herein is (1) tamper-resistant/tamper-indicating, (2) capable of being nondestructively identified and checked for tampering, (3) simple to install and inspect, (4) reusable, in that the seal's collar and a major portion of the fiber optic bundle can be used to make new seals, (5) easily adaptable to a variety of situations, and (6) relatively inexpensive to produce.

It should be understood that the invention is not limited to the exact details of construction shown and described herein for obvious modifications will occur to persons skilled in the art.

We claim the following:

1. A security seal for detecting tampering with a secured enclosure, the seal comprising:
   a length of fiber optic bundle for conducting light along individual fibers within the bundle;
   a collar fastening the free ends of the bundle together so that the individual fibers in one of the bundle ends become arbitrarily intermixed with the individual fibers in the other bundle end, with all of the fiber ends facing the same direction; and
   an opening formed in the collar to permit viewing of the intermixed fibers at their ends.

2. The subject matter set forth in claim 1 wherein the collar includes a flexible ferrule which exerts compressive forces against the intermixed fibers to sufficiently hold the fibers in the collar without physical damage thereto.

3. The subject matter set forth in claim 2 wherein the collar includes mating threaded members which compress the ferrule when the members are fastened together.

4. The subject matter set forth in claim 1 together with viewing means positioned adjacent the collar opening for magnifying an image at the collar opening, which is unique for each particular seal.

5. The subject matter set forth in claim 4 together with means associated with the viewing means for introducing light along the bundle which generates the unique image at the collar opening.

6. The subject matter set forth in claim 5 together with a camera positioned adjacent to the viewer for recording the image when desired.

7. The subject matter set forth in claim 6 wherein means are formed in the viewing means for receiving the collar therein and positioning the opening of the collar in an optical path with a lens of the camera.

8. The subject matter set forth in claim 5 together with a reticle attached to the viewing means for marking coordinates of light spots by individual fibers at the collar opening.

9. The subject matter set forth in claim 8 wherein the reticle can be rotated to align a coordinate marker with preselected light spots.

10. The subject matter set forth in claim 9 wherein the marker is a radial marker cooperating with a stationary polar angle indicator.

* * * * *